May 30, 1939.  O. F. GRAEBNER ET AL  2,160,068

WINDOW MOUNTING

Filed Oct. 10, 1936

INVENTORS
OTTO F. GRAEBNER
FRED J. WESTROPE
BY
Harness, Dickey Pierce & Hann
ATTORNEYS.

Patented May 30, 1939

2,160,068

UNITED STATES PATENT OFFICE 2,160,068

WINDOW MOUNTING

Otto F. Graebner and Fred J. Westrope, Detroit, Mich., assignors to The Murray Corporation of America, Detroit, Mich., a corporation of Delaware Application October 10, 1936, Serial No. 104,926

3 Claims. (Cl. 296—84)

This invention relates primarily to molding strips. More particularly it relates to a novel specific form of molding strip primarily adapted for securing a resilient glass receiving channel element in position in a windshield opening.

The primary object of the present invention is to provide a molding strip which is adapted to conceal and provide an ornamental finish for a pair of mating upstanding flanges which serve to define and to provide one wall of a rabbet around a window opening. The molding strip of the present invention serves not only the purpose of providing an ornamental cover for the upstanding mating flanges but serves the purpose of accurately and positively retaining a resilient glass receiving channel element in position with respect to said mating flanges.

In one form the invention contemplates the provision of a molding strip having a reveal or body portion adapted to hide the upstanding mating flanges and lateral portions on either side of the body portion bent inwardly toward each other, one of said last mentioned portions adapted to engage one side of the mating flanges and the other of said portions adapted to engage the other side thereof. One of these inwardly bent portions is provided with a plurality of integrally formed outwardly projecting spaced prongs which are adapted to enter the side of a resilient channel shaped element preferably formed of rubber, which element serves to receive the marginal edge of a glass or pane to be mounted within the window opening and these prongs serve the purpose of retaining this resilient channel element in predetermined position with respect to said mating flanges and molding strip.

In another form the invention contemplates the provision of a molding strip which has a portion at one side thereof bent laterally, which portion is adapted to enter and engage the inner surface of one leg of the resilient channel element and the portion at the other side of the body of the molding strip is bent to provide a downwardly presenting channel which is adapted to receive and grip the upwardly extending mating flanges thus accurately retaining the resilient channel elements in position with respect to said flanges.

It is an object of the present invention to provide a molding strip having the above desired characteristics which molding strip is extremely simple in construction, cheap to manufacture and which may easily and conveniently be applied to a window opening in the manner described above.

Many other and further important advantages, objects and features of the present invention will become clearly apparent from the following specification when considered in connection with accompanying drawing forming a part thereof.

Figure 1:
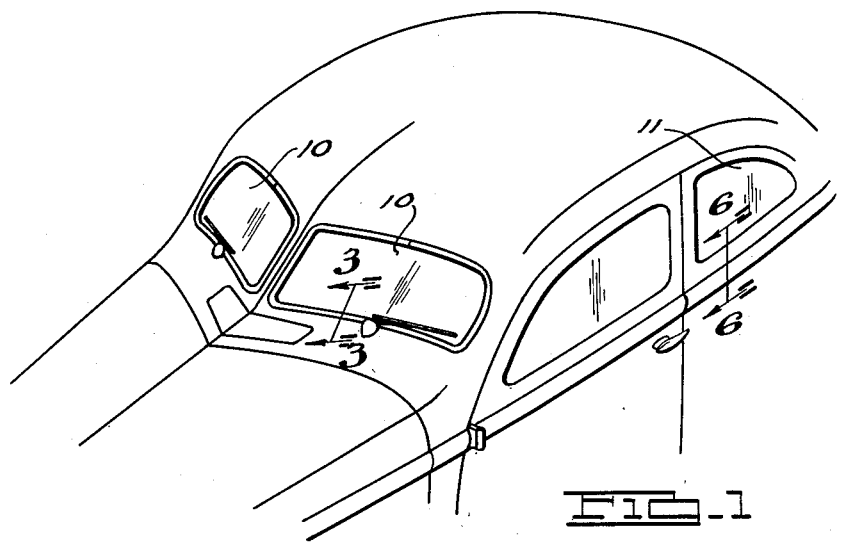
Figure 1 is a fragmentary perspective view of a vehicle body embodying the improved molding strip of the present invention.

The vehicle body shown is of substantially conventional construction and comprises a body formed of a plurality of sheet metal panels which serve to define windshield openings 10 and rear quarter window openings 11. While it will be readily appreciated that the improved molding strip of the present invention will find practical utility for the purpose of retaining channel elements around the marginal edges of movable windows the molding strips are primarily designed for the purpose of retaining in position resilient channel elements such as are conventionally used around the marginal edges of permanently mounted windows which are sealed in position. Consequently the specific embodiments of the invention shown in the drawing has illustrated the same as applied to either a windshield pane or to a rear quarter window pane which as is conventional in vehicle body constructions as now fabricated are permanently mounted in position and are not adapted to be open at any time.

Figure 2:
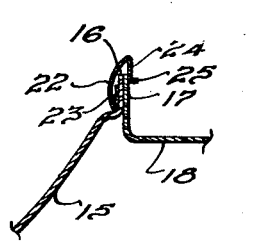
Fig. 2 is an enlarged fragmentary sectional view through the marginal edge of the window opening illustrating in detail the manner in which the improved molding strip is secured in position in the window opening.
Figure 3:
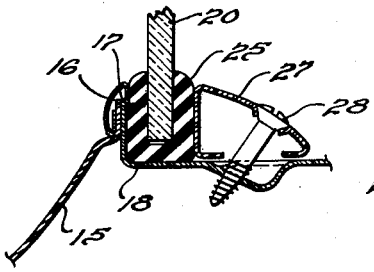
Fig. 3 is an enlarged fragmentary sectional view taken substantially on the line 3—3 of Fig. 1, illustrating in detail the manner in which a window or windshield pane is mounted within a window opening by means of the improved molding strip.
Figure 4:
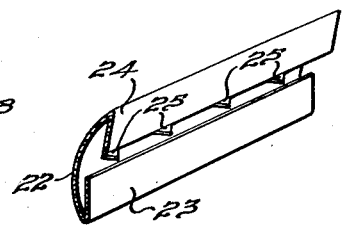
Fig. 4 is a fragmentary perspective view of the molding strip embodying the improvements of the present invention shown in the preceding figures.

The construction shown in Figs. 2, 3, and 4 includes a cowl top panel 15 which as is conventional in vehicle body construction has upstanding flange 16 at its rear marginal edge, which flange is adapted to lie substantially in the plane of the windshield opening and to define marginal edge thereof. Mating with the flange 16 is a complemental upstanding flange 17 integrally formed on the marginal edge of a lower windshield header bar 18, which if desired may constitute the instrument panel of the vehicle. The body portion of the panel 18 is bent at substantially right angles to the flange 17 in order that a rabbet will be formed adapted to receive the marginal edge of a windshield panel 20 to be permanently mounted within the opening thus formed.

The panels making up the vehicle body may be preformed to provide mating upstanding flanges in continuation of the flanges 16 and 17 extending entirely around and defining the window or windshield opening thus providing a window receiving rabbet therearound.

The molding strips of the present invention may be formed of sufficient length to extend entirely around the windshield opening thus having their ends in abutting relation as shown or may if desired, merely be of sufficient length to extend along one side thereof. These molding strips include a generally arcuately shaped body portion 22. The side portions of the strip adjacent this arcuately shaped body portion are bent inwardly to provide flanges 23 and 24 respectively which are folded in from the marginal edges of the body portion to lie in substantially parallel planes. The extreme marginal edge of the flange 24 is bent at right angles to the body portion to provide a spaced series of relatively sharp pointed prongs 25, the function of which will hereinafter become clear.

It will be seen that this molding strip may be slipped over the mating flanges 16 and 17 and that the interior surface of the side portion of flange 24 will engage the flange 17 and the exterior surface of the portion 22 will engage the flange 16 thus retaining the molding strip in position. It will be seen that the arcuate body portion 22 of the molding strip serves to hide and conceal the mating flanges 16 and 17 and provide an attractive finish for the joint between these panels.

As is conventional in constructions of this general character, the marginal edge of the windshield pane 20 is seated within a resilient channel element 25 formed of rubber or other suitable similar resilient material and it will be seen that when this rubber channel element is seated within the rabbet formed by the panel 18 and the mating flanges 16 and 17 the prongs 25 on the marginal edge of the side portion 24 of the molding strip will enter the wall of this channel element and retain the same in position within the rabbet. The resilient channel element 25 may additionally be retained in position within this rabbet by means of a conventional removably mounted garnish molding 27 adapted to extend entirely around the windshield opening which garnish molding is retained in position by means of screws 28 which are adapted to be received by the panel 18. The normal tension of the side portions 23 and 24 of the molding strip serve to firmly and resiliently grip the mating flanges 16 and 17 and retain the molding strip in position.

Figure 5:
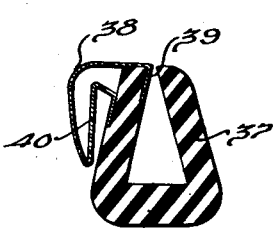
Fig. 5 is a fragmentary sectional view illustrating a modified type of molding strip associated with a resilient window receiving channel element.
Figure 6:
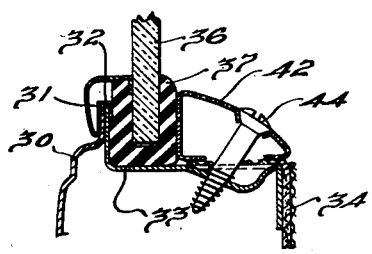
Fig. 6 is an enlarged fragmentary sectional view taken substantially on the line 6—6 of Fig. 1 illustrating in detail the improved molding strip shown in Fig. 5 associated with a window and window receiving channel for retaining same in position with respect to a vehicle body.

In Figures 5 and 6 of the drawing a modified form of molding strip is shown which molding strip is illustrated in Fig. 6 as being utilized for the purpose of permanently mounting the resilient channel frame of a rear quarter window in position within the vehicle body. However, it will be readily appreciated that this molding strip is equally well applicable for the mounting of a windshield pane in a windshield opening as has been described above.

In this form of the invention the body construction shown comprises a reveal plane 30 which constitutes the exterior surface of the vehicle body. This reveal panel is provided with a flange 31 surrounding and defining the opening of the rear quarter window. Mating with the flange 31 a complemental flange 32 formed upon the marginal edge of an inner panel 33 which constitutes the inner wall of the vehicle body. This inner panel 33 may be preformed as is conventional in the art to provide means for mounting a trim panel 34 thereon in order to provide interior finish for the vehicle body.

The rear quarter window includes a pane 36 the marginal edge of which is adapted to be received in a resilient channel element 37 formed of rubber or other suitable material, which channel element as is shown in Fig. 5 is preferably preformed in such a manner that it will inherently serve to resiliently grip the marginal edge of the pane 36 with which it is associated. The improved molding strip illustrated in this form of the invention comprises a generally arcuately shaped body portion 38, which is adapted to hide the mating flanges 31 and 32 and has one marginal edge thereof bent over to provide a flange 39 adapted to engage the inner surface of one leg of the resilient channel element 37. The opposite marginal portion of this molding strip is preformed to provide a downwardly presenting channel 40 adapted to fit over the mating flanges 31 and 32 and preferably preformed in order that the inherent resiliency of the metal will cause this channel element 40 to resiliently grip the mating flanges and retain the molding strip in position thereon. It will be seen by reference to Figure 5 that the molding strip is formed in such a manner that it is inherently tensioned and serves to retain the resilient channel element firmly in position with respect to the rabbet in which it is seated. As is conventional in constructions of this kind, the marginal edge of the pane, including the resilient channel element, may be firmly additionally retained in position by means of a removably mounted garnish molding member 42 which may be secured in position upon the inner panel 33 by means of suitable conventional screws 44.

It will be readily understood that the above described embodiments of the invention are merely illustrative of the generic inventive concept presented in this application. Many other and further modifications thereof falling within the scope of the invention as defined in the subjoined claims will become clearly apparent to those skilled in the art.

What is claimed is:

1. A molding strip for mounting a resilient window receiving channel adjacent an upstanding flange said molding strip having one edge thereof bent to provide a channel adapted to receive said flange and the other edge thereof being bent to provide a flange adapted to engage the inner surface of one leg of said resilient channel element.

2. A molding strip for mounting a resilient window receiving channel adjacent a pair of mating upstanding flanges, said molding strip having one edge bent to form a channel adapted to receive and resiliently grip said flanges and the other edge thereof adapted to engage said resilient channel.

3. In a vehicle body construction, a pair of body panels having upstanding mating flanges together forming one wall of a rabbet adapted to receive the marginal edge of a window, a window, a resilient channel element surrounding said window and receiving the marginal edge of said window in the channel thereof, said channel element being seated against said mating flanges, and a molding strip having a portion thereof engaging one leg of said channel and another portion extending over and engaging said flanges to secure said channel element in position against said flanges.

OTTO F. GRAEBNER.
FRED J. WESTROPE.